(12) United States Patent  
Oodake et al.

(10) Patent No.: US 9,214,024 B2
(45) Date of Patent: Dec. 15, 2015

(54) THREE-DIMENSIONAL DISTANCE MEASUREMENT APPARATUS AND METHOD THEREFOR

(75) Inventors: Tatsuya Oodake, Zushi (JP); Tetsuro Aikawa, Shinagawa-ku (JP); Yoshinori Satoh, Yokohama (JP); Makoto Ochiai, Yokohama (JP); Yasuhiro Yuguchi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 620 days.

(21) Appl. No.: 13/637,203

(22) PCT Filed: Mar. 16, 2011

(86) PCT No.: PCT/JP2011/056264
§ 371 (c)(1),
(2), (4) Date: Oct. 15, 2012

(87) PCT Pub. No.: WO2011/118476
PCT Pub. Date: Sep. 29, 2011

(65) Prior Publication Data
US 2013/0021452 A1 Jan. 24, 2013

(30) Foreign Application Priority Data
Mar. 25, 2010 (JP) ................ 2010-070572

(51) Int. Cl.
*H04N 13/02* (2006.01)
*H04N 15/00* (2006.01)
(Continued)

(52) U.S. Cl.
CPC .............. *G06T 7/0075* (2013.01); *G01B 11/03* (2013.01); *G01B 11/245* (2013.01); *G01S 11/12* (2013.01); *G06T 2207/10012* (2013.01)

(58) Field of Classification Search
CPC ................ G06T 19/006; G06T 15/00; G06T 2207/10028; G06T 17/00; G06T 7/0065; G06T 2207/10012; G06T 7/0075; H04N 13/0022; H04N 13/0203
USPC ............... 348/42–60; 702/152–153
See application file for complete search history.

(56) References Cited

U.S. PATENT DOCUMENTS

| 5,805,289 A | 9/1998 | Corby, Jr. et al. |
| 6,023,276 A | 2/2000 | Kawai et al. |

(Continued)

FOREIGN PATENT DOCUMENTS

| JP | 8 16783 | 1/1996 |
| JP | 8 101038 | 4/1996 |

(Continued)

OTHER PUBLICATIONS

The Extended European Search Report issued Jun. 17, 2014, in Application No. / Patent. No. 11759282.4—1906 / 2551633 PCT/JP2011056264.

(Continued)

*Primary Examiner* — Andy Rao
*Assistant Examiner* — Jared Walker
(74) *Attorney, Agent, or Firm* — Oblon, McClelland, Maier & Neustadt, L.L.P.

(57) ABSTRACT

A three-dimensional imaging unit includes a plurality of image pickup devices that image an image and a rotation drive device which rotates the image pickup devices and adjusts optical axes such that reflections of an object to be measured in a space to be measured have a predetermined amount of overlap. An association calculating unit calculates position association information of pixels when a required measurement point is mapped onto a plurality of images. A three-dimensional shape calculating unit calculates a three-dimensional shape of the object to be measured using the position association information and rotational information of the rotation drive device. A three-dimensional shape estimation calculating unit estimates, from the three-dimensional shape, a three-dimensional shape of a region of the object to be measured where the three-dimensional shape is not obtained. A three-dimensional measurement coordinates calculating unit calculates, from an estimation result, three-dimensional coordinates of two distance measurement points designated on the object to be measured. A distance calculating unit calculates a distance between the two points using the three-dimensional coordinates.

5 Claims, 4 Drawing Sheets

(51) Int. Cl.
*G06T 7/00* (2006.01)
*G01S 11/12* (2006.01)
*G01B 11/03* (2006.01)
*G01B 11/245* (2006.01)

(56) References Cited

U.S. PATENT DOCUMENTS

| | | | |
|---|---|---|---|
| 6,556,307 B1 * | 4/2003 | Norita et al. | 356/608 |
| 6,868,194 B2 | 3/2005 | Tu et al. | |
| 2001/0014171 A1 * | 8/2001 | Iijima et al. | 382/154 |
| 2008/0228438 A1 * | 9/2008 | Lin | 702/152 |
| 2008/0260238 A1 * | 10/2008 | Pfister et al. | 382/154 |

FOREIGN PATENT DOCUMENTS

| | | |
|---|---|---|
| JP | 9 251093 | 9/1997 |
| JP | 2000 20720 | 1/2000 |
| JP | 2001 167272 | 6/2001 |
| JP | 2003 12740 | 1/2003 |
| JP | 2008 15895 | 1/2008 |

OTHER PUBLICATIONS

Taiwanese Office Action issued Jul. 22, 2013, in Taiwan Patent Application No. 100109868.

Chunlei Xia, et al., "A stereo vision based method for autonomous spray of pesticides to plant leaves", IEEE International Symposium on Industrial Electronics (ISIE 2009), Jul. 5-8, 2009, pp. 909-914.

Marcel Germann, et al., "Automatic Pose Estimation for Range Images on the GPU", Sixth International Conference on 3-D Digital Imaging and Modeling (3DIM 2007), Aug. 21-23, 2007, 9 pages.

International Search Report Issued May 24, 2011 in PCT/JP11/56264 Filed Mar. 16, 2011.

* cited by examiner

THREE-DIMENSIONAL DISTANCE MEASUREMENT APPARATUS AND METHOD THEREFOR

TECHNICAL FIELD

The present invention relates to a technique for measuring a three-dimensional distance such as a gap and, more particularly, to a three-dimensional distance measurement apparatus capable of appropriately performing distance measurement even if there are few features in a measurement region and a method for the three-dimensional distance measurement apparatus.

BACKGROUND ART

With increasing aged deterioration of plants, it is considered that opportunities to maintain and repair a reactor internal structure and equipment will be increased. In an in-core repair work or like, it is necessary to obtain dimensional information such as geometry of an object and geometry of an access route to a target spot (gap). It is important for such dimensional information to not only depend on design drawing information but also depend on as-built information.

Conventional techniques for gap measurement include a three-dimensional measurement method by stereoscopy using two or more images. The three-dimensional measurement method is capable of performing planar shape measurement at a time and is a method which allows efficient implementation of shortest distance measurement necessary as measurement of a gap between structures (see, e.g., Patent Document 1).

PRIOR ART DOCUMENT

Patent Document

Patent Document 1: Japanese Patent Laid-Open Publication No. 7-218251

DISCLOSURE OF THE INVENTION

Problems to be Solved by the Invention

In a measurement method using stereoscopy, since measurement equipment in the vicinity of a front surface of an object to be measured nearly directly confronts the object to be measured, the measurement equipment can relatively easily perform shape measurement. However, at an edge portion of a curved surface or the like, an angle of a measurement plane with respect to a camera is large, and hence, there are few feature points (features) in a measurement region concerned. Because of such reason, a problem, such as a reduction in measurement accuracy and an inability of a spot desired to be measured to fall within an imaging range, may be caused.

The present invention has been made in consideration of the above-described circumstances and has as an object to provide a three-dimensional distance measurement apparatus capable of improving shape measurement accuracy at an edge portion of a curved surface or the like and capable of measuring a distance between two points in an object to be measured with high accuracy, and also provide a method for the three-dimensional distance measurement.

Another object of the present invention is also to provide a three-dimensional distance measurement apparatus and a method for the three-dimensional distance measurement according to the present invention so as to perform accurate distance measurement even if enough design drawing information or the like of an object to be measured cannot be obtained.

Means for Solving the Problem

To solve the above described object, a three-dimensional distance measurement apparatus according to the present invention, comprising:

a three-dimensional imaging unit including a plurality of image pickup devices that image an image and a rotation drive device which rotates the image pickup devices and adjusts optical axes such that reflections of an object to be measured in a space to be measured have a predetermined amount of overlap;

an association calculating unit that calculates position association information in which pixel positions at a time when a required measurement point in the space to be measured is mapped onto a plurality of the images are associated;

a three-dimensional shape calculating unit that calculates a three-dimensional shape based on three-dimensional coordinates of the object to be measured, using the position association information and rotational information obtained from the rotation drive device;

a three-dimensional shape estimation calculating unit that estimates, from the three-dimensional shape obtained from the three-dimensional shape calculating unit, a three-dimensional shape of a region of the object to be measured where the three-dimensional shape is not obtained;

a three-dimensional measurement coordinates calculating unit that calculates three-dimensional coordinates of two distance measurement points designated on the object to be measured, from an estimation result obtained from the three-dimensional shape estimation calculating unit; and a distance calculating unit that calculates a distance between the two points using the three-dimensional coordinates obtained from the three-dimensional measurement coordinates calculating unit.

The above object can further achieve by providing a three-dimensional distance measurement apparatus according to the present invention, comprising:

a three-dimensional imaging unit including a plurality of image pickup devices that images an image at different positions and a rotation drive device which rotates the image pickup devices and adjusts optical axes such that reflections of an object to be measured in a space to be measured have a predetermined amount of overlap;

an association calculating unit that calculates position association information in which pixel positions at a time when a required measurement point in the space to be measured is mapped onto a plurality of the images are associated;

a three-dimensional shape calculating unit that calculates a three-dimensional shape based on three-dimensional coordinates of the object to be measured, using the position association information and rotational information obtained from the rotation drive device;

an integrated coordinates detection unit that detects, as corresponding points, portions with overlapping shapes of the object to be measured in a plurality of the three-dimensional shapes having different coordinate systems calculated by the three-dimensional shape calculating unit, on the basis of a plurality of images shot at different positions by the three-dimensional imaging unit;

a coordinate system integration calculating unit that integrates the different coordinate systems into an arbitrary coordinate system using the corresponding points obtained by the integrated coordinates detection unit;

a three-dimensional measurement coordinates calculating unit that calculates three-dimensional coordinates of two distance measurement points designated on the object to be measured, from a result of the coordinates integration; and a distance calculating unit that calculates a distance between the two points using the three-dimensional coordinates obtained from the three-dimensional measurement coordinates calculating unit.

In order to further achieve the above object, the present invention provides a three-dimensional distance measurement method, comprising the steps of:

preparing a plurality of image pickup devices that image an image, rotating the image pickup devices and adjusting optical axes such that reflections of an object to be measured in a space to be measured have a predetermined amount of overlap, and performing imaging with the image pickup devices;

calculating position association information in which pixel positions at a time when a required measurement point in the space to be measured is mapped onto a plurality of the images are associated;

calculating a three-dimensional shape based on three-dimensional coordinates of the object to be measured, using the position association information and information on rotation of the image pickup devices;

estimating, from the three-dimensional shape coordinates, a three-dimensional shape of a region of the object to be measured in a case where the three-dimensional shape is not obtained;

calculating three-dimensional coordinates of two distance measurement points designated on the object to be measured, from a result of estimating the three-dimensional shape; and calculating a distance between the two points using the three-dimensional coordinates.

Furthermore, to achieve the above object, the present invention further provides a three-dimensional distance measurement method, comprising the steps of:

preparing a plurality of image pickup devices which image an image, rotating the image pickup devices and adjusting optical axes such that reflections of an object to be measured in a space to be measured have a predetermined amount of overlap, and performing imaging with the image devices;

performing the step of performing the imaging at different positions;

calculating position association information in which pixel positions at a time when a required measurement point in the space to be measured is mapped onto a plurality of the images are associated;

calculating a three-dimensional shape based on three-dimensional coordinates of the object to be measured, using the position association information and information on rotation of the image pickup devices;

detecting, as corresponding points, portions with overlapping shapes of the object to be measured in a plurality of the three-dimensional shapes having different coordinate systems calculated on the basis of a plurality of images imaged at different positions;

integrating the different coordinate systems into an arbitrary coordinate system using the corresponding points;

calculating three-dimensional coordinates of two distance measurement points designated on the object to be measured from a result of the coordinates integration; and calculating a distance between the two points using the three-dimensional coordinates.

Effects of the Invention

According to the three-dimensional distance measurement apparatus and a method for the three-dimensional distance measurement of the present invention can improve shape measurement accuracy at an edge portion of a curved surface or the like and measure a distance between two points in an object to be measured with high accuracy.

EMBODIMENT FOR CARRYING OUT THE INVENTION

First Embodiment

A first embodiment of a three-dimensional distance measurement apparatus and a method for the three-dimensional distance measurement according to the present invention will be described hereunder with reference to the accompanying drawings.

Figure 1:
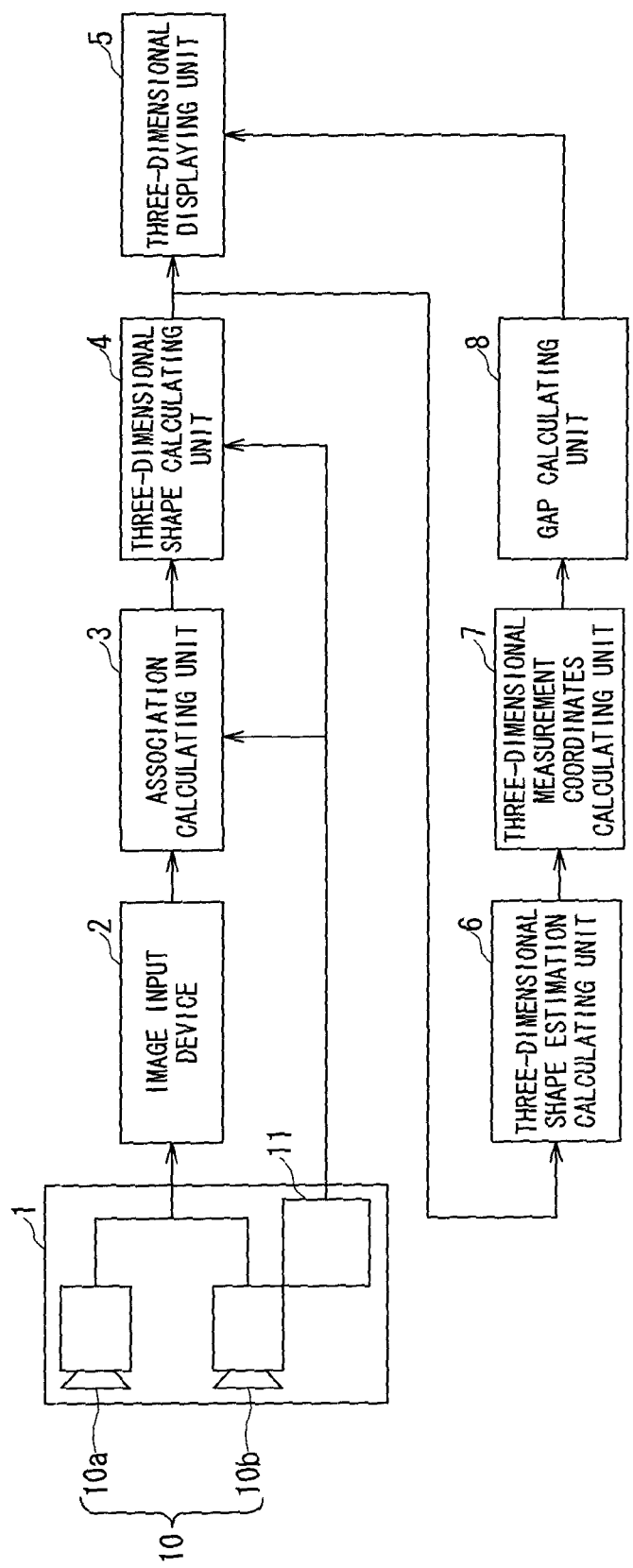
FIG. 1 is a block diagram showing a first embodiment of a three-dimensional distance measurement apparatus and a three-dimensional distance measurement method according to the present invention.

FIG. 1 is a block diagram showing the first embodiment of the three-dimensional distance measurement apparatus and three-dimensional distance measurement method according to the present invention. A three-dimensional distance measurement apparatus illustrated in FIG. 1 shows a configuration of a three-dimensional distance measurement apparatus using stereoscopy. Herein, there is described a case in which a three-dimensional distance measurement apparatus and a method for the three-dimensional distance measurement are applied to measurement of length of a defect formed on a surface of an in-core structure (e.g., piping) of a nuclear power plant of circular cylindrical shape, spherical shape, or rectangular parallelepiped shape and measurement of a gap between in-core structures. An object to be measured of a three-dimensional distance measurement apparatus will be referred to as "a gap or the like" hereinafter.

The three-dimensional distance measurement apparatus includes a three-dimensional imaging unit 1, an image input device 2, an association calculating unit 3, a three-dimensional shape calculating unit (shape calculating portion) 4, a three-dimensional displaying unit 5, a three-dimensional shape estimation calculating unit (shape estimation calculating unit) 6, a three-dimensional measurement coordinates calculating unit (measurement coordinates calculating unit) 7, and a gap calculating unit 8.

The image input device 2, the association calculating unit 3, the shape calculating unit 4, the three-dimensional displaying unit 5, the shape estimation calculating unit 6, the measurement coordinates calculating unit 7, and the gap calculating unit 8 are implemented by a personal computer or the like which executes various programs stored to implement functions (to be described later).

The three-dimensional imaging unit 1 includes an image pickup device 10 and a rotation drive device 11. The image pickup device 10 includes a first image pickup device 10a and a second image pickup device 10b. Two images imaged by the first image pickup device 10a and second image pickup device 10b are input to the association calculating unit 3 via the image input device 2.

The rotation drive device 11 is connected to the image pickup device 10. The rotation drive device 11 rotates the image pickup devices 10a and 10b about three axes orthogonal to each other. Rotation angle information of the rotation drive device 11 is output to the association calculating unit 3 and shape calculating unit 4.

The association calculating unit 3 regards, as identical points, respective points of two images imaged by the image pickup device 10 onto which a measurement point in a space to be measured is mapped and associates pixel positions of the two images.

The shape calculating unit 4 computes three-dimensional coordinates using a result of associating the pixel positions of the two images obtained from the association calculating unit 3 and the rotation angle information output from the rotation drive device 11 and calculates a three-dimensional shape at a surface of a reactor internal structure.

The shape estimation calculating unit 6 estimates a three-dimensional shape of the reactor internal structure as a circular arc shape, a straight line shape, or the like from the three-dimensional shape obtained from the shape calculating unit 4.

The measurement coordinates calculating unit 7 calculates measurement coordinates serving as measurement points for a gap or the like on a circular arc or a straight line designated by an operator using an input device (not shown) from a result of estimating the three-dimensional shape obtained from the shape estimation calculating unit 6.

The gap calculating unit 8 calculates the gap or the like using the measurement coordinates obtained from the measurement coordinates calculating unit 7.

The three-dimensional displaying unit 5 displays the images obtained from the image pickup device 10, the three-dimensional coordinates and three-dimensional shape obtained by the shape calculating unit 4, a cross-section of the three-dimensional shape, and the gap or the like obtained by the gap calculating unit 8.

Operation and effects or advantages of the three-dimensional distance measurement apparatus according to the first embodiment will be described.

The three-dimensional imaging unit 1 is appropriately installed at a position where a gap or the like can be imaged. The three-dimensional imaging unit 1 causes the rotation drive device 11 to rotate and control one of the image pickup devices 10a and 10b and adjust optical axis directions of the image pickup devices 10a and 10b so as to coincide with each other such that reflections of a reactor internal structure, a gap or the like of which is to be measured at a spot deemed to be most suitable for a measurement distance from the image pickup device 10 to a reactor internal (in-core) structure, have a predetermined amount of overlap. The three-dimensional imaging unit 1 simultaneously causes the image pickup devices 10a and 10b to image or shoot a surface of the in-core structure.

The association calculating unit 3 regards, as identical points, respective points of two images picked up by the image pickup device 10, onto which a measurement point in a space to be measured is mapped, and associates pixel positions using rotation angle information output from the rotation drive device 11. Extraction of identical points is performed using a required known image processing technique.

The shape calculating unit 4 computes three-dimensional coordinates using a result of associating the pixel positions of the two images obtained from the association calculating unit 3 and rotation angle information output from the rotation drive device 11 and calculates a three-dimensional shape at the surface of the in-core structure.

Figure 2:
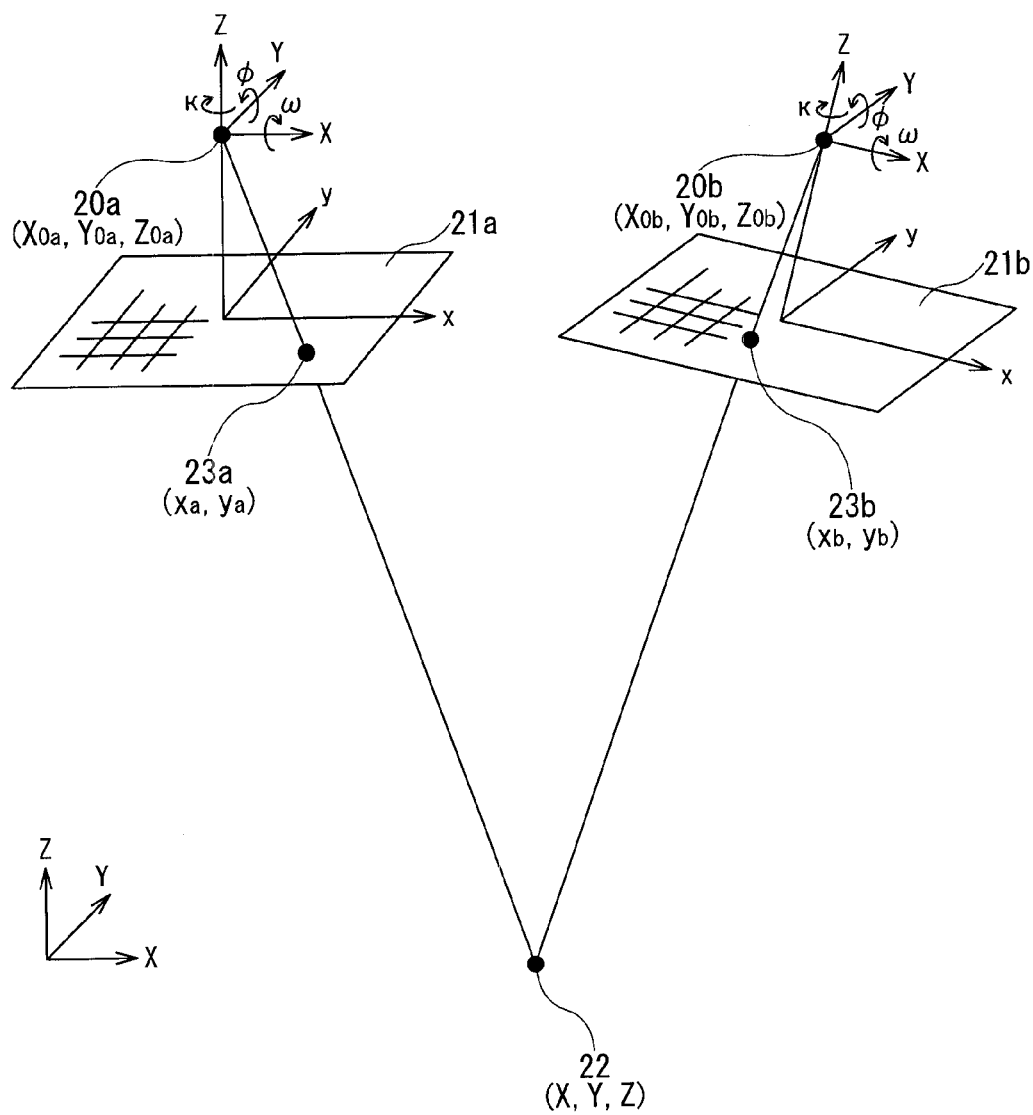
FIG. 2 is an explanatory view for obtaining three-dimensional coordinates from an image imaged by a three-dimensional imaging unit.

Hereunder, a method for obtaining three-dimensional coordinates from images imaged by the three-dimensional imaging unit 1 will be described with reference to FIG. 2.

In a coordinate system for a space to be measured, the image pickup devices 10a and 10b perform imaging at projection center coordinates 20a ($X_{0a}$, $Y_{0a}$, $Z_{0a}$) and 20b ($X_{0b}$, $Y_{0b}$, $Z_{0b}$). A measurement point 22 (X, Y, Z) in the space to be measured is mapped as corresponding pixel coordinates 23a ($x_a$, $y_a$) and 23b ($x_b$, $y_b$) onto image pickup planes 21a and 21b, respectively.

Three-dimensional coordinates of the measurement point are obtained using following Expression (1) as a conditional equation that is derived from the fact that the projection center coordinates 20a (or 20b), the pixel coordinates 23a (or 23b), and the measuring point 22 are in line with each other. This allows three-dimensional measurement of a gap or the like of an in-core structure.

In Expression (1), f represents a focal length, and $a_{11}$ to $a_{33}$ represent rotational transformations using the amounts of rotation about axes of the image pickup device 10.

$$\begin{cases} x = -f \dfrac{a_{11}(X - X_0) + a_{12}(Y - Y_0) + a_{13}(Z - Z_0)}{a_{31}(X - X_0) + a_{32}(Y - Y_0) + a_{33}(Z - Z_0)} \\ y = -f \dfrac{a_{21}(X - X_0) + a_{22}(Y - Y_0) + a_{23}(Z - Z_0)}{a_{31}(X - X_0) + a_{32}(Y - Y_0) + a_{33}(Z - Z_0)} \end{cases} \quad (1)$$

The shape estimation calculating unit 6 estimates, as a circular arc shape or a straight line shape, a three-dimensional shape of an in-core structure, a three-dimensional shape of which cannot be obtained with sufficient accuracy, on the basis of a three-dimensional shape obtained from the shape calculating portion 4.

If a three-dimensional shape of a portion of an object to be detected which is calculated by the shape calculating unit 4 is a curved shape such as a circular cylindrical shape or a spherical shape, the estimation as a circular arc is performed. On the other hand, if the shape is a shape having a straight surface, such as a rectangular parallelepiped shape, the estimation as a straight line is performed.

More specifically, the shape estimation calculating unit 6 selects a spot of a calculated three-dimensional shape which is measured at a position nearly directly confronting the image pickup device 10 of the three-dimensional imaging unit 1. That is, the spot is a portion different from a boundary portion, such as an edge, where a three-dimensional shape cannot be measured with sufficient accuracy and is a spot where a three-dimensional shape is measured with sufficient accuracy, unlike a boundary portion such as an edge. The selection is automatically performed by the shape estimation calculating unit 6 or is performed upon receipt of input from an operator via the input device (not shown).

The shape estimation calculating unit 6 extracts a three-dimensional shape at a spot on an object to be measured which is measured in a nearly directly confronting state on the basis of an arbitrary cross-sectional section (e.g., X-Y cross-sections in a fixed section in a Z-axis direction in a space to be measured) designated by an operator and, if the object to be measured is of circular cylindrical shape or the like, obtains a circular arc from a plurality of sets of three-dimensional coordinates obtained from the section.

Assuming here that the plurality of sets of three-dimensional coordinates are equal in a height direction (e.g., a vertical direction with respect to the object to be measured (the Z-axis direction in the space to be measured)), a surface shape of the object to be measured can be assumed not as a sphere but as a circle. For this reason, the surface shape of the object to be measured can be defined by the general equation of a circle: $(x-a)^2+(y-b)^2=r^2$, where (a, b) represents a center of the circle, and (r) represents a radius.

The shape estimation calculating unit 6 solves simultaneous equations from the plurality of sets of three-dimensional coordinates obtained from the shape calculating unit 4 by, e.g., method of least squares to obtain the center and radius, on the basis of the general equation of a circle.

Similarly, if the extracted three-dimensional shape of the object to be measured is a rectangular parallelepiped shape or the like, the shape estimation calculating unit 6 obtains a straight line from a plurality of sets of three-dimensional coordinates obtained from the section.

The shape estimation calculating unit 6 can define a surface shape of the object to be measured by the general equation of a straight line: $ax+by+c=0$, where a, b, and c represent constants. The shape estimation calculating unit 6 solves the simultaneous equation from the plurality of obtained sets of three-dimensional coordinates by, e.g., method of least squares to obtain the constants, on the basis of the general equation of a straight line. If estimation as a straight line is performed, extension of a straight line leads to an infinite number of measurement points. For this reason, an operator arbitrarily sets length of a straight line for the estimation and sets a processing range.

It is to be noted that if the object to be measured is inclined with respect to a coordinate system of the image pickup device, shape estimation as a circular arc or a straight line is performed by appropriately using the general equation of a circle and the general equation of an ellipse $(x^2/a^2+y^2/b^2=1)$ or the general equation of a straight line.

The measurement coordinates calculating unit 7 calculates three-dimensional coordinates of a gap measurement point on a circular arc or a straight line on the basis of the general equations of a circle and a straight line which are results of estimating a three-dimensional shape of the in-core structure obtained from the shape estimation calculating unit 6. A gap measurement point is designated, for example, in a three-dimensional shape displayed on the three-dimensional displaying unit 5 by an operator. For example, an operator designates two reactor internal structures, a gap between which is desired to be measured, or designates two points on a surface of one reactor internal structure.

The measurement coordinates calculating unit 7 calculates, for each of two reactor internal structures sandwiched between gap spaces, candidates for a set of three-dimensional coordinates of a gap measurement point on a surface of the reactor internal structure which are to be used in subsequent gap calculation. To measure length of a defect, the measurement coordinates calculating unit 7 calculates three-dimensional coordinates of gap measurement points designated by an operator.

The gap calculating unit 8 calculates a gap or the like using three-dimensional coordinates of gap measurement points calculated by the measurement coordinates calculating unit 7.

In order to measure a gap between two reactor internal structures, the gap calculating unit 8 obtains, from candidates for respective sets of three-dimensional coordinates of a plurality of gap measurement points on surfaces of the reactor internal structures which are calculated by the measurement coordinates calculating unit 7, a combination of sets of three-dimensional coordinates of gap measurement points in a cross-section (e.g., an X-Y cross-section) where a distance between the reactor internal structures is at a minimum, and calculates a distance between the reactor internal structures.

In such calculation, if the objects to be measured are both estimated as a circular cylindrical shape having a circular arc, the gap calculating unit 8 obtains a cross-section where a line connecting centers of both circular arcs is at a minimum as a cross-section where the distance between the reactor internal structures is at a minimum.

The gap calculating unit 8 can narrow down the plurality of candidates for measurement coordinates to three-dimensional coordinates of gap measurement points used in the gap measurement, and then, calculate the gap.

If one of the objects to be measured is estimated as a circular cylindrical shape having a circular arc, and another is estimated as a rectangular parallelepiped shape having a straight line, the gap calculating unit 8 calculates, as the gap, a distance on a cross-section where a line connecting centers of both the objects to be measured is at a minimum which is at a minimum within a range corresponding to a length set on a straight line by an operator.

In the meantime, if the objects to be measured are both estimated as a straight line, the gap calculating unit 8 calculates, as the gap, a distance which is at a minimum within ranges corresponding to lengths set on the straight lines by an operator.

The gap calculating unit 8 performs the above-described calculation within a measurement range in a preset height direction (e.g., the Z-axis direction) and automatically computes a shortest distance.

Furthermore, in the case of measuring, e.g., length of a defect on a surface of a reactor internal structure, the gap calculating unit 8 performs measurement on the basis of three-dimensional coordinates on the surface where two designated points are present.

According to the three-dimensional distance measurement apparatus and the method for the three-dimensional distance measurement apparatus according to the first embodiment, even if the measurement points for measuring a gap or the like cannot be obtained from a three-dimensional shape at a spot, such as an edge portion of a curved surface, where an angle of the image pickup device 10 with respect to an in-core structure is large, or at a spot outside a imaging range of the image pickup device 10, three-dimensional coordinates of the gap measurement points present on a circular arc and an extension of a straight line can be obtained by estimating a three-dimensional shape of the in-core structure from a plurality of sets of three-dimensional coordinates in a cross-sectional section for which a three-dimensional shape is measured and the general equations of a circle, a straight line, and the like. This process allows the measurement of a gap or the like.

Furthermore, by estimating a three-dimensional shape using a result of three-dimensional shape measurement, the candidates for respective sets of three-dimensional coordinates of designated gap measurement points can be calculated, and a shortest distance required for gap measurement can be further measured. This allows an improvement in the measurement accuracy at an edge portion of a curved surface or the like and the accurate gap measurement even in a case where enough design drawing information and the like are not obtained.

Moreover, since a gap between the reactor in-core structures can be measured with high accuracy, it can be determined whether repair equipment used for reactor interior repair can pass or not pass between the in-core structures.

Still furthermore, in a case when length of a defect on a surface that is a curved surface of a reactor internal structure or the like is measured, since three-dimensional coordinates on the surface can be obtained by estimating a three-dimensional shape as a circular arc, not a simple linear distance between two sets of three-dimensional coordinates, but accurate length of the defect can be measured.

Second Embodiment

A second embodiment of a three-dimensional distance measurement apparatus and a method for the three-dimensional distance measurement apparatus according to the present invention will be described with reference to the drawings.

Figure 3:
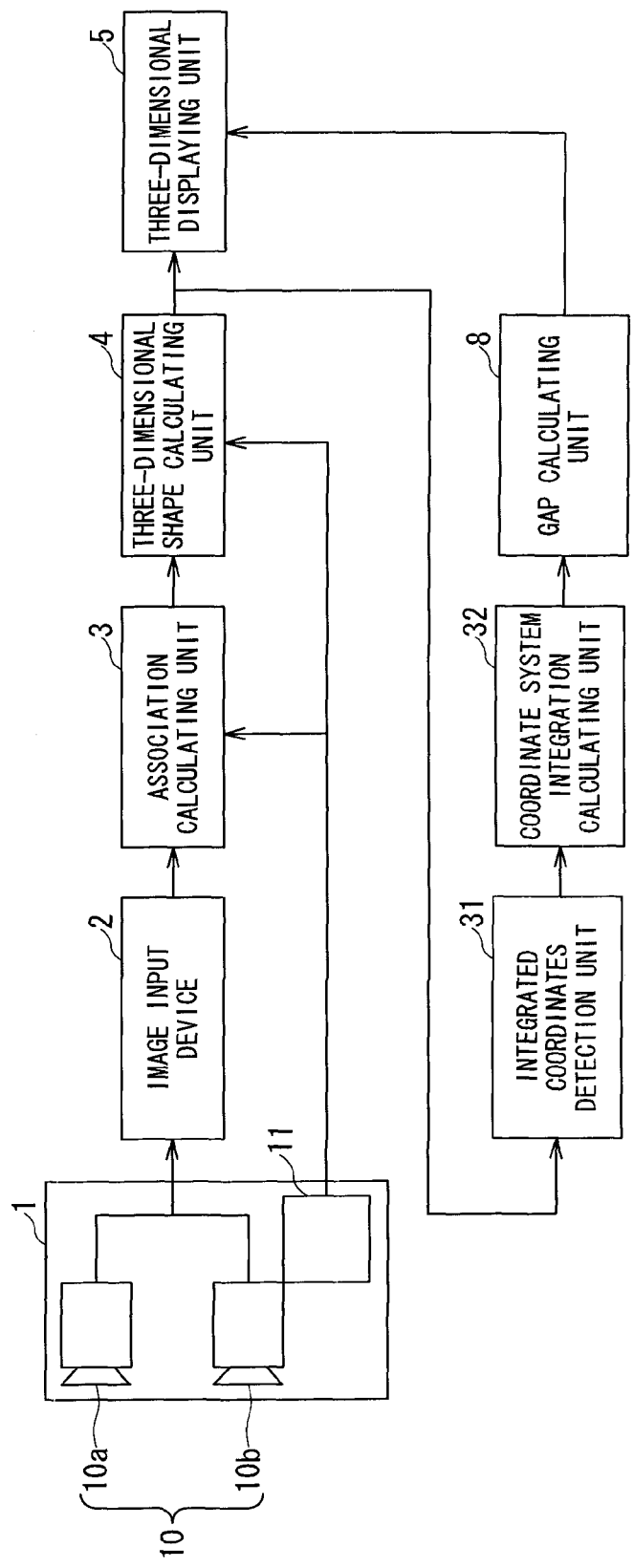
FIG. 3 is a block diagram showing a second embodiment of a three-dimensional distance measurement apparatus and a three-dimensional distance measurement method according to the present invention.

FIG. 3 is a block diagram showing the second embodiment of the three-dimensional distance measurement apparatus and three-dimensional distance measurement method according to the present invention.

The three-dimensional distance measurement apparatus and the method for the three-dimensional distance measurement apparatus according to the second embodiment are different from the three-dimensional distance measurement apparatus and the method for the three-dimensional distance measurement apparatus according to the first embodiment in that an integrated coordinates detection portion 31 and a coordinate system integration calculating portion 32 are provided instead of the three-dimensional shape estimation calculating unit 6 and three-dimensional measurement coordinates calculating unit 7. Components and units corresponding to those in the first embodiment are denoted by same reference numerals, and a redundant description will be omitted herein.

The three-dimensional distance measurement apparatus and the method for the three-dimensional distance measurement apparatus according to the second embodiment perform the measurement at a plurality of measurement spots, subject the three-dimensional shapes at the plurality of measurement positions to coordinates integration, and perform the gap measurement. Further, it is to be noted that the three-dimensional shapes at the plurality of measurement spots are measurement results having different coordinate systems. The three-dimensional distance measurement apparatus and the method for the three-dimensional distance measurement apparatus of the present embodiment are effective, for example, when a measurement region of a gap or the like does not fit in an image which is obtained by one imaging operation of an image pickup device 10, and a three-dimensional shape required for the gap measurement cannot be obtained.

The integrated coordinates detection unit 31 detects identical corresponding points required to integrate images imaged at a plurality of spots by the image pickup device 10 and different coordinate systems of three-dimensional shapes obtained from the images.

The coordinate system integration calculating unit 32 integrates the different coordinate systems using the identical corresponding points detected by the integrated coordinates detection unit 31.

Hereunder, operation and effects or advantages of the three-dimensional distance measurement apparatus and the method for the three-dimensional distance measurement apparatus according to the second embodiment will be described.

Like the first embodiment, a three-dimensional imaging unit 1 is arranged at a position where a gap or the like can be imaged. If an entire region of a gap serving as an object to be measured cannot be imaged at one spot, as described above, the three-dimensional imaging unit 1 moves to a different position such that the entire region of the object to be measured forming a gap or the like is imaged, and again performs the imaging operation. The imaging is performed at two or more spots so as to obtain required images.

An association calculating unit 3 and a three-dimensional shape calculating unit 4 perform required image processing, thereby calculating three-dimensional shapes. The three-dimensional shapes are output to the integrated coordinates detection portion 31.

The integrated coordinates detection unit 31 detects the identical corresponding points required to integrate the coordinate systems. The detection of the identical corresponding points is performed using any one of the following first function and the second function below.

The first function is a function of determining corresponding points from three or more points designated by an operator and required to integrate a plurality of pieces of three-dimensional shape information. More specifically, the first function is to determine the corresponding points substantially identical to each other in overlapping portions of three-dimensional shapes at a plurality of measurement points on three-dimensional shapes or on a plurality of imaged images displayed by the three-dimensional displaying unit 5, in accordance with an instruction received from an operator.

The second function is a function of detecting overlapping portions from three-dimensional shapes based on images obtained by imaging at measurement positions by the shape matching and automatically detecting, as corresponding points for coordinate system integration, the top three or more sets of measurement coordinates with the smallest measurement coordinates errors included in the overlapping portions.

The shape matching is a process of detecting matching or roughly matching portions of two or more three-dimensional shapes. In a case of simply performing the shape matching, a large number of rotational transformations and translation operations are required. Further, if a satisfactory three-dimensional shape measurement result is not obtained, the shape matching cannot be performed.

Accordingly, the integrated coordinates detection unit 31 can perform, as the second function, substantially same processing as processing of the association calculating unit 3 and can also associate pixel positions of substantially identical points using images imaged at two or more measurement spots (at least three images imaged at at least two spots). The integrated coordinates detection portion 31 performs rotational transformations and translation operations by an affine transformation given by Expression (2), using five or more of the associated points.

In the following Expression (2), symbols X, Y, and Z are coordinates of an associated point in an image imaged at a first measurement spot, symbols X', Y', and Z' are coordinates of an associated point in an image imaged at a second measurement point, letters a, b, c, d, e, f, g, h, and i are rotational elements, and $t_x$, $t_y$, and $t_z$ are translational elements.

$$[X', Y', Z', 1] = [X, Y, Z, 1] \begin{bmatrix} a & b & c & 0 \\ d & e & f & 0 \\ g & h & i & 0 \\ t_x & t_y & t_z & 1 \end{bmatrix} \begin{vmatrix} a & b & c \\ d & e & f \\ g & h & i \end{vmatrix} \neq 0 \quad (2)$$

On the basis of the corresponding points after the transformation obtained by the above-described processing, the integrated coordinates detection unit 31 automatically detects, as identical corresponding points, the top five or more points with the smallest measurement coordinates errors within a rotational correction amount range and a translational correction amount range set by an operator.

The coordinate system integration calculating unit 32 transforms coordinates of a measurement point detected by the first function or the second function of the integrated coordinates detection unit 31 on the basis of the affine transformation equation given above as the Expression (2) and integrates the coordinate systems. This processing allows acquisition of the three-dimensional coordinates of a measurement point of a gap or the like. Here, a reference coordinate system and a coordinate system to be transformed are arbitrarily set.

The gap calculating unit 8 calculates a gap or the like using the measurement coordinates calculated by the coordinate system integration calculating unit 32. Like the first embodiment, the gap calculating unit 8 measures, as a gap, a spot where a distance between the in-core structures is at the minimum of measurement spots designated by an operator or measures the length of a defect.

According to the three-dimensional distance measurement apparatus and the method for the three-dimensional distance measurement apparatus according to the second embodiment, the gap measurement can be performed by detecting the corresponding points for the coordinates integration using a result of measuring the three-dimensional shapes at a plurality of measurement spots and performing the coordinates integration. Accordingly, the three-dimensional shapes of the in-core structure over a relatively wide range can be acquired, regardless of an angle of view of the image pickup device 10, and a gap or the like between the in-core structures can be measured, in addition to the advantages achieved by the first embodiment.

A three-dimensional distance measurement apparatus may include the integrated coordinates detection unit 31 and coordinate system integration calculating unit 32 according to the second embodiment, in addition to the three-dimensional shape estimation calculating unit 6 and three-dimensional measurement coordinates calculating unit 7 according to the first embodiment.

If an object to be measured is local (e.g., a defect on a surface of piping), parallax can be obtained by adjusting one of the optical axis directions with the rotation drive device 11 according to the first embodiment so as to coincide with another, and three-dimensional shape measurement can be performed with high accuracy. On the other hand, if a measurement range of, e.g., a gap between pieces of piping extends over a wide range, the coordinates integration is performed using, e.g., a result of the measuring three-dimensional shapes measured at a plurality of spots according to the second embodiment. This allows three-dimensional shape measurement without consideration of an angle of view with respect to an object to be measured and a measurement distance and allows one apparatus to measure distances associated with the objects to be measured with various measurement distances.

Third Embodiment

A third embodiment of a three-dimensional distance measurement apparatus and a method for the three-dimensional distance measurement apparatus according to the present invention will be described hereunder with reference to the drawings.

Figure 4:
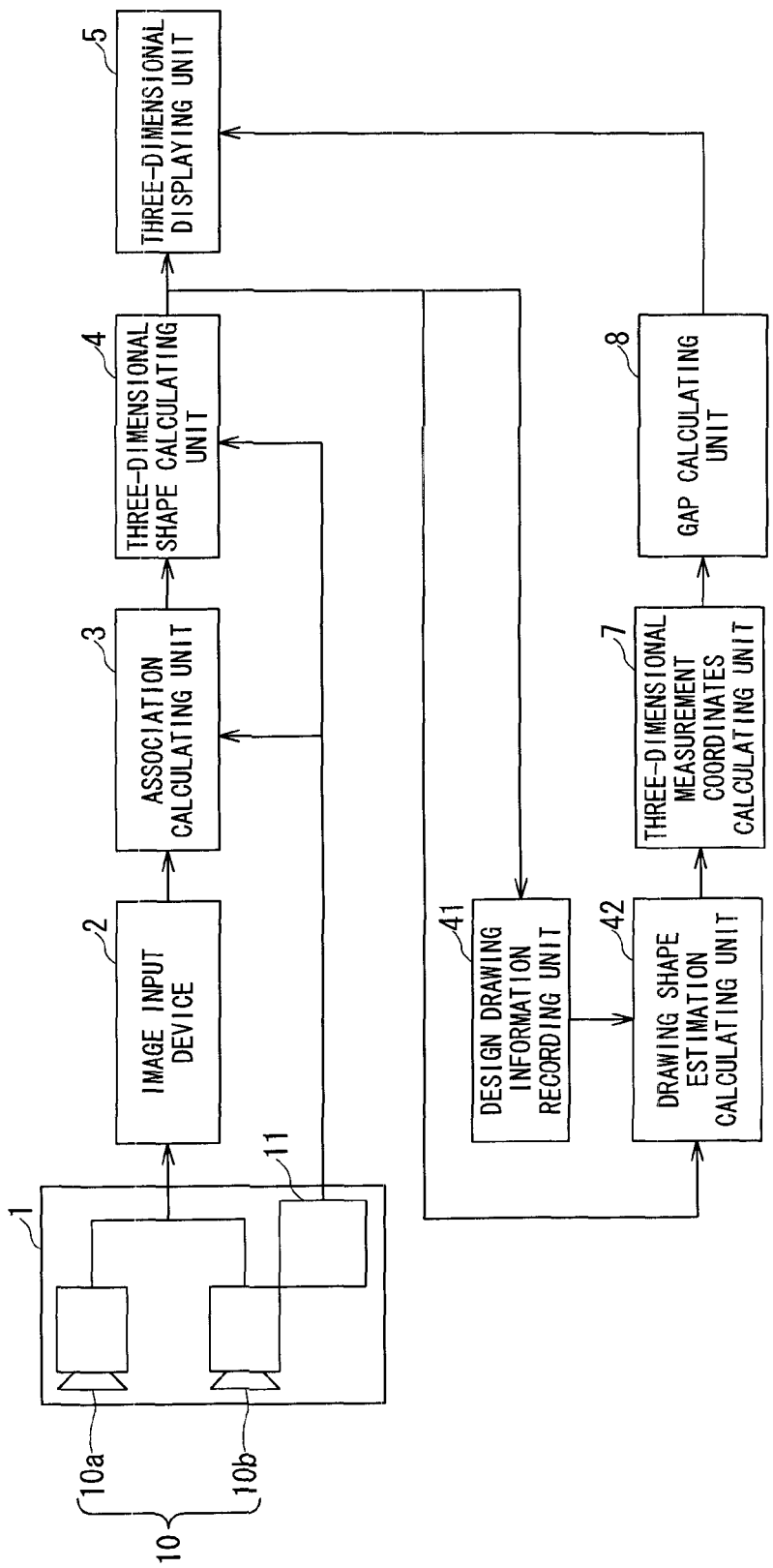
FIG. 4 is a block diagram showing a third embodiment of a three-dimensional distance measurement apparatus and a three-dimensional distance measurement method according to the present invention.

FIG. 4 is a block diagram showing the third embodiment of the three-dimensional distance measurement apparatus and three-dimensional distance measurement method according to the present invention.

The three-dimensional distance measurement apparatus and the method for the three-dimensional distance measurement apparatus according to the third embodiment are different from the three-dimensional distance measurement apparatus and the method for the three-dimensional distance measurement apparatus according to the first embodiment in that a design drawing information recording unit 41 and a drawing shape estimation calculating unit 42 are provided instead of the three-dimensional shape estimation calculating unit 6.

The three-dimensional distance measurement apparatus and the method for the three-dimensional distance measurement apparatus according to the third embodiment estimate a shape on the basis of information such as a CAD drawing and perform gap measurement. It is to be noted that components and portions corresponding to those in the first embodiment are denoted by same reference numerals and that a redundant description will be omitted herein.

The design drawing information recording unit 41 stores design drawing information such as a diameter and a length of an reactor in-core structure on CAD drawing data or a design drawing of the in-core structure. The design drawing information is appropriately input and output from and to the design drawing information recording unit 41. The design drawing information recording unit 41 can also record a result of measuring a three-dimensional shape of the in-core structure.

The drawing shape estimation calculating unit 42 determines the in-core structure corresponding to an object to be measured, using design drawing information recorded in the design drawing information recording unit 41. The drawing shape estimation calculating unit 42 estimates, as a circular arc shape or a straight line shape, three-dimensional shape information of an object to be measured, and the three-dimensional shape of the three-dimensional information cannot be obtained with sufficient accuracy, from design drawing information of the in-core structure and calculates the three-dimensional coordinates of the gap measurement points. The drawing shape estimation calculating unit 42 corresponds to the three-dimensional shape estimation calculating unit 6 according to the first embodiment.

Hereunder, operation and advantages or effects of the three-dimensional distance measurement apparatus and the method for the three-dimensional distance measurement apparatus according to the third embodiment will be described.

Like the first embodiment, a three-dimensional imaging unit 1 is arranged at a position where a gap or the like can be imaged. The association calculating unit 3 and the three-dimensional shape calculating unit (shape calculating unit) 4 perform required image processing, thereby calculating a three-dimensional shape. The three-dimensional shape is then output to the design drawing information recording unit 41 and drawing shape estimation calculating unit 42.

The drawing shape estimation calculating unit 42 compares the design drawing information such as a diameter and a length of the in-core structure obtained from CAD drawing data or the like recorded in the design drawing information recording unit 41 with a result obtained from the shape calculating unit 4. The drawing shape estimation calculating unit 42 interpolates shape information which lacks in the three-dimensional shape obtained from the shape calculating unit 4, using the design drawing information, and obtains the candidates for the three-dimensional coordinates of the gap measurement points.

More specifically, the drawing shape estimation calculating unit 42 checks a three-dimensional shape at a surface of an object to be measured at a position directly confronting an image pickup device 10 of the three-dimensional imaging unit 1, which is a calculating result from the shape calculating unit 4, against the drawing information input to the design drawing information recording unit 41 and estimates a shape of the in-core structure, a three-dimensional shape of which cannot be obtained with sufficient accuracy, as a circular arc shape or a straight line shape. It is further to be noted that the estimation as a circular arc and the estimation as a straight line identical to those in the three-dimensional shape estimation calculating unit 6 according to the first embodiment are performed.

In a case when an accurate drawing information is recorded in the design drawing information recording unit 41, the drawing shape estimation calculating unit 42 performs required image processing by comparing the drawing information with measurement data obtained from the shape calculating unit 4. More specifically, the design drawing information recording unit 41 aligns a coordinate system for a three-dimensional shape, using the coordinates of a center of the in-core structure on the design drawing. The drawing shape estimation calculating unit 42 complements a three-dimensional shape on the basis of information on the diameter of the in-core structure of the circular cylindrical shape or length of the in-core structure of the cubic shape.

The three-dimensional measurement coordinates calculating unit (measurement coordinates calculating unit) 7 calculates the candidates for the three-dimensional coordinates of the gap measurement points for the subsequent processing on the basis of the three-dimensional coordinates information of the in-core structure estimated by the drawing shape estimation calculating unit 42. The gap calculating unit 8 then calculates a gap or the like using the three-dimensional coordinates of the gap measurement points calculated by the measurement coordinates calculating unit 7. Further, the measurement coordinates calculating unit 7 and gap calculating unit 8 perform same processing as processing of the processing units according to the first embodiment and a redundant description will be omitted in the third embodiment.

According to the three-dimensional distance measurement apparatus and the method for three-dimensional distance measurement apparatus according to the third embodiment, in addition to the advantages achieved by the first embodiment, the shape information which lacks in a three-dimensional shape calculated by the shape calculating unit 4 can be interpolated by using the design drawing information such as a diameter and a length of the in-core structure on the CAD drawing data or a design drawing, and the gap measurement can be performed with higher accuracy.

REFERENCE NUMERALS

1 three-dimensional imaging unit
2 image input device
3 association calculating unit
4 three-dimensional shape calculating unit
5 three-dimensional displaying unit
6 three-dimensional shape estimation calculating unit
7 three-dimensional measurement coordinates calculating unit
8 gap calculating unit
10, 10a, 10b image pickup device
11 rotation drive device
31 integrated coordinates detection unit
32 coordinate system integration calculating unit
41 design drawing information recording unit
42 drawing shape estimation calculating unit

The invention claimed is:

1. A three-dimensional distance measurement apparatus, comprising:
   a three-dimensional imaging unit, implemented by circuitry, including a plurality of image pickup devices and a rotation drive device which rotates the image pickup devices to adjust optical axes thereof such that reflections of an object obtained with the plurality of image pickup devices have at least a predetermined amount of overlap; and
   an association calculating unit, implemented by the circuitry, that calculates position association information, the position association information associating pixel positions of a required measurement point on a plurality of the images obtained with the plurality of image pickup devices;
   a three-dimensional shape calculating unit, implemented by the circuitry, that calculates a three-dimensional shape using the position association information and rotational information obtained from the rotation drive device;
   a three-dimensional shape estimation calculating unit, implemented by the circuitry, that estimates an estimated three-dimensional shape of a region that is not obtained with the three-dimensional shape calculated with the three-dimensional shape calculating unit;
   a three-dimensional measurement coordinates calculating unit, implemented by the circuitry, that calculates three-dimensional coordinates of two distance measurement points from at least one of the three-dimensional shape and the estimated three-dimensional shape; and
   a distance calculating unit, implemented by the circuitry, that calculates a distance between the two distance measurement points with the three-dimensional coordinates obtained from the three-dimensional measurement coordinates calculating unit.

2. The three-dimensional distance measurement apparatus according to claim 1, further comprising a design drawing information recording unit, implemented by the circuitry, that records design drawing information of the object, wherein the three-dimensional shape estimation calculating unit is configured to compare the design drawing information with the three-dimensional shape.

3. The three-dimensional distance measurement apparatus according to claim 1, further comprising:
   an integrated coordinates detection unit, implemented by the circuitry, that detects corresponding points in portions with overlapping shapes of the object in a plurality of three-dimensional shapes having different coordinate systems on the basis of a plurality of images obtained at different positions with the three-dimensional imaging unit; and
   a coordinate system integration calculating unit, implemented by the circuitry, that integrates the different coordinate systems into an arbitrary coordinate system using the corresponding points obtained by the integrated coordinates detection unit, wherein
   the three-dimensional measurement coordinates calculating unit is configured to calculate three-dimensional coordinates of the two distance measurement points in the arbitrary coordinate system.

4. A three-dimensional distance measurement method, comprising the steps of:
- adjusting optical axes of a plurality of image pickup devices such that reflections of an object obtained with the plurality of image pickup devices have a predetermined amount of overlap;
- calculating position association information, wherein the position association information associates pixel positions of a required measurement point on a plurality of the images;
- calculating a three-dimensional shape based on three-dimensional coordinates of the object, using the position association information and information on rotation of the image pickup devices;
- estimating an estimated three-dimensional shape of a region that is not obtained with the three-dimensional shape;
- calculating three-dimensional coordinates of two distance measurement points from at least one of the three-dimensional shape and the estimated three-dimensional shape; and
- calculating a distance between the two points using the three-dimensional coordinates.

5. The three-dimensional distance measurement method according to claim 4, further comprising a step of recording design drawing information of the object, wherein the estimating step estimates the estimated three-dimensional shape by comparing the design drawing information with the three-dimensional shape.

* * * * *